DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 8

T904,010

REGENERATIVE VANADIUM COORDINATION CATALYST PROCESS

Tsuneichi Takeshita, Newark, Del., assignor to E. I. du Pont de Nemours and Company, Wilmington, Del.

Filed Dec. 27, 1971, Ser. No. 212,762

Int. Cl. C08f *1/56, 15/04*

U.S. Cl. 260—80.78

No Drawing. 9 Pages Specification

A process for polymerizing $\alpha$-olefins in the presence of a regenerative coordination catalyst which is a mixture of:

A. The reaction product formed of an organic halogenating agent of the formula $R(CX_3)_n$ per mole of $V_2O_5$, R being aryl, haloaryl, haloalkyl, alkaryl, or haloalkaryl; X being halogen; and $n$ being 1–3; and B. An organoaluminum compound.

The process and catalysts are effective for polymerizing homopolymers and copolymers of $\alpha$-olefins including copolymers of EPDM elastomers.

Polymerization can be carried out with conventional methods as bulk, solution, and slurry polymerization techniques.